United States Patent [19]

Searl

[11] Patent Number: 4,520,476
[45] Date of Patent: May 28, 1985

[54] APPARATUS FOR ENABLING THE DUPLEX OPERATION OF A TRANSMITTER AND RECEIVER

[75] Inventor: Eugene P. Searl, Dallas, Tex.

[73] Assignee: Rockwell International Corporation, El Segundo, Calif.

[21] Appl. No.: 449,055

[22] Filed: Dec. 13, 1982

[51] Int. Cl.³ ............................................. H04B 1/56
[52] U.S. Cl. ........................................ 370/32; 370/38
[58] Field of Search ............................ 370/32, 27, 38; 179/170.2

[56] References Cited

U.S. PATENT DOCUMENTS

| | | | |
|---|---|---|---|
| 3,928,853 | 12/1975 | Olson | 370/38 |
| 4,320,498 | 3/1982 | Justice | 370/32 |
| 4,370,741 | 1/1983 | Haass | 370/32 |
| 4,393,494 | 7/1983 | Belforte et al. | 370/32 |

FOREIGN PATENT DOCUMENTS 2839875 3/1980 Fed. Rep. of Germany ........ 370/32

Primary Examiner—Douglas W. Olms
Attorney, Agent, or Firm—Richard A. Bachand; V. Lawrence Sewell; H. Fredrick Hamann

[57] ABSTRACT

An apparatus for enabling full duplex operation of a co-located transmitter and receiver on the same frequency. Directional couplers in the transmit and receive transmission lines (or line) provide continuous samples of transmit and receive signals to an adaptive combiner. The combiner includes a ninety degree quadrature hybrid for producing in-phase and quadrature signals from the transmit sample, inverters for each of the in-phase and quadrature signals to selectively invert them, attenuators to controllably attenuate each of the in-phase and quadrature signals, and a summer to add the selectively inverted and attenuated in-phase and quadrature signals with the receive signal sample to cancel portions of the receive signal deriving from the transmit signal.

6 Claims, 3 Drawing Figures

APPARATUS FOR ENABLING THE DUPLEX OPERATION OF A TRANSMITTER AND RECEIVER

BACKGROUND OF THE INVENTION

1. Field of the Invention

This invention relates to improvements in transmitters and receivers, and more particularly to apparatus for enabling the duplex or simultaneous operation of a transmitter and a receiver on the same or closly adjacent frequencies.

2. Description of the Prior Art

In the past, it has been often desired to operate a transmitter and receiver on the same or closly adjacent frequencies; for instance, in some cases it is advantageous to operate the transmitter on an upper sideband and the receiver on a lower sideband of the same frequency. To date, however, this has been ineffectively achieved.

Also, in the past, in order to achieve isolation between transmitters and receivers, complicated and expensive filtering arrangements have been required to be incorporated, oftentimes, into the hardware of the respective transmitters and receivers.

BRIEF DESCRIPTION OF THE INVENTION

In light of the above, it is therefore, an object of the invention to provide apparatus for enabling the duplex operation of a transmitter on the same or closly adjacent frequencies.

It is another object of the invention to provide an apparatus of the type described which can be used with existing equipment with little or no modification of the equipment.

These and other objects, features, and advantages will become apparent to those skilled in the art from the following detailed description when read in conjunction with the following detailed description, accompanying drawings and appended claims.

As the term "sampling" is used in the application, it means deriving from a first signal (the "sampled"signal) a second signal (the "sample" signal) which s representative of (for example, proportional to) the sampled signal, but not, in general equivalent to it. For example, the sample signal may have a fraction of the power of the sampled signal. In the preferred embodiment to be described herein, the sampling is continuous, but samples at discrete time intervals could be used. Thus, the term "sampling" as used herein is more general than the use of the term in the field of sampled data systems.

In its broad aspect, the invention presents an apparatus for enabling duplex operation of a transmitter and receiver and includes means for sampling a transmitted signal and means for adjusting the phase and the amplitude of the sample signal. Means are also provided for sampling a received signal and for adding the amplitude and phase adjusted sample transmitter signal to it, so that any interference in the received signal due to the presence of the transmitter signal is cancelled. In one aspect of the invention, the means for sampling the transmitted signal is a directional coupler associated with a transmitter transmission line. The directional coupler samples the signal generated by the transmitter travelling towards a transmitting antenna to produce an interference sample signal comprising at least a portion of the transmitted signal. Likewise, the means for sampling a received signal is a directional coupler associated with a receiver transmission line for sampling a signal received by a receiving antenna travelling in the direction of the receiver. Also, in a preferred embodiment, the respective transmitter and receiver transmisson lines are the same, and the transmitting and receiving antennas are the same.

BRIEF DESCRIPTION OF THE DRAWING

The invention is illustrated in the accompanying drawings in which.

In the various figures of the drawing, like reference numerals are used to denote like or similar parts.

DETAILED DESCRIPTION OF THE PREFERRED EMBODIMENTS

Figure 1:
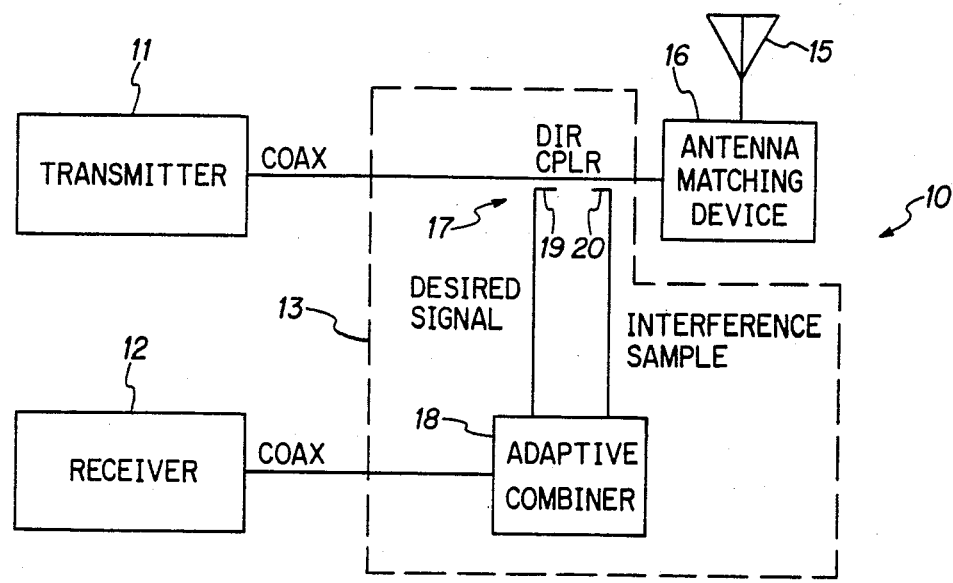
FIG. 1 is a block diagram showing the simultaneous operation adapter in accordance with the invention in conjunction with a typical transmitter and receiver installation.

In accordance with the invention, as shown on FIG. 1, the signal from the transmitter 11 to be transmitted is conducted along a transmission line 14, such as a coax cable, illustrated, and is coupled to an antenna 15 by an antenna matching device 16, such as a balun coil or the like. On the other hand, the signal received on the antenna 15 is conducted to the receiver 12, and is obtained, in accordance with the invention, by a directional coupler 17, as will be described below, in detail.

The apparatus 10, in accordance with a preferred embodiment of the invention for enabling the simultaneous operation of the transmitter 11 and receiver 12 on the same frequency or closely adjacent frequencies, employs an adaptive interference cancelling system 13 to null out the signal, noise and intermodulation products of the local transmitter 11. As illustrated in FIG. 1 the interference cancelling system 13 includes two main elements, a coupler 17 and an adaptive combiner 18. The coupler 17 includes two directional couplers 19 and 20. Thus, in the forward direction the first directional coupler 20 provides a pure, coherent sample of the transmitted signal, and in the reverse direction the second directional coupler 19 provides the desired received signal. (It should be noted that with appropriate design, the first and second couplers 20 and 19 can be combined into a single coupler structure, not shown, with the forward and reverse signals electronically separated for use in the system, as described below.) In any event, both the transmit sample and the desired signal are coupled to the adaptive combiner 13 wherein both signals are summed coherently such that the forward and reflected transmit signals are effectively cancelled, leaving the desired receive signal for application to the receiver 12.

As is known in the art, directional couplers are transmission line devices which operate to couple a small portion of the energy within a transmission line to an output port in an unidirectional manner. They are frequently employed to permit measurement of the forward and reflected power (reverse direction power) in transmission systems. The three most important parameters specifying a directional coupler's performance are, insertion loss, coupling loss and isolation. In general, the insertion loss of a directional coupler should be less than 0.5 dB to minimize heating in the coupler elements. The isolation or effective directionality of the coupler should be greater than 50 dB to ensure that interference due to direct coupling is well below the other interference sources.

In operation of the apparatus of FIG. 1, a pure sample of the transmitter forward signal power plus intermodulation products (IMD) and transmitter broadband noise is diverted by the directional coupler 20 from the original path to a path designated as "interference sample" in FIG. 1. Likewise, the reverse directional coupler 19 couples a portion of the energy components which are travelling from the antenna matching device toward the transmitter, into the "desired signal" path. This reverse direction energy consists of the desired receive signal plus the reflected portion of the transmitter output signal, IMD, and noise.

In the design of the reverse direction coupler 19, it might be presumed that it would be desirable to couple the reverse travelling energy with minimum loss to the desired signal path to ensure reception of very weak desired signals. The atmospheric noise and man-made noise power in the HF spectrum, however, is quite large compared to such very weak desired signals. An optimum HF system should therefore be designed so that the atmospheric noise is at or just below the receiver AGC threshold to provide a maximum receiver dynamic range. For instance, HF noise at 2 megahertz is typically 30 dB above one microvolt per meter. If a 32 foot high whip antenna is assumed, the expected noise level would be approximately 293 microvolts. This consideration plus the fact that a typical antenna matching device will provide an apparent power gain at 2 megahertz of more than 6 dB, suggests the selection of 15 dB for the reverse directional coupler loss in the desired signal path.

The coupling loss required in the forward direction, on the other hand, should be chosen to provide sufficient power to provide an inteference sample which is larger than the largest anticipated interference in the desired signal path. For example, assuming that the antenna matching device of FIG. 1 will match the antenna impedance and provide a transmission line voltage standing wave ratio (VSWR) of 2:1, the reflected power (interference) will be 9.5 dB below the forward power. A typical desired signal coupling loss of 15 dB, plus the reflection loss of 9.5 dB gives a maximum interference signal in the desired signal path of 24.5 dB below the transmitted power. Therefore, to ensure adequate power in the interference sample path a coupler loss of 20 dB may be chosen for the forward power direction.

Figure 2:
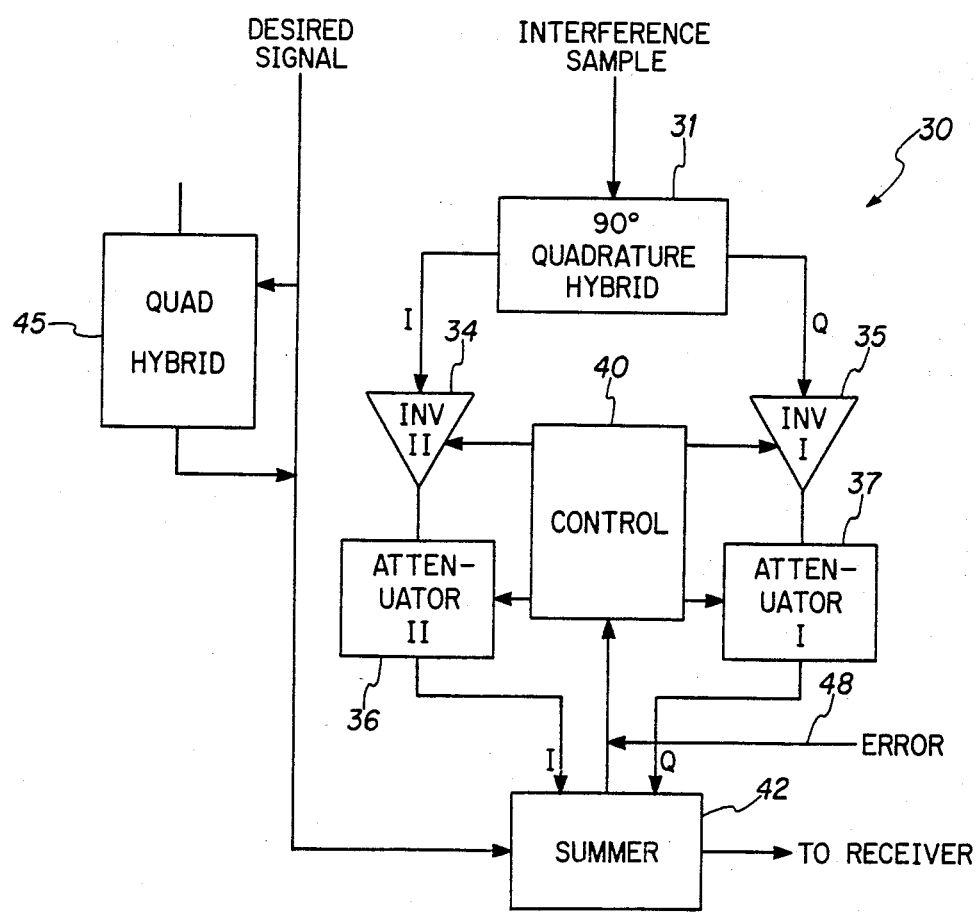
FIG. 2 is a block diagram showing the interrelationship and operation of the parts of the adaptive combiner portion of the simultaneous operation adapter in accordance with the invention.

The purpose of the adaptive combiner 18 is to create a signal from the forward transmit sample which is exactly opposite in phase and in equal amplitude to that of the reflected transmit component contained in the desired signal. This adapted signal must then be summed with the desired signal to eliminate the reflected transmit signal and provide a resultant receive signal. One circuit for accomplishing such summation is shown in FIG. 2. The circuit 30 includes a 90 degree quadrature hybrid 31, first and second signal inverters 34 and 35, amplitude attenuators 36 and 37, an inverter and attenuator control circuit 40, and a summing circuit 42.

The 90 degree quadrature hybrid 31 is a lumped constant network which takes a single signal input and outputs two equal amplitude signals with a phase differential of 90 degrees. Thus, the forward transmit sample is converted by the quadrature hybrid 31 into two outputs, denoted I and Q, which are coupled to the respective signal inverters 34 and 35. The inverter operation is established by the control circuitry 40 which selectively switches the inverters on or off to provide phase control of 180 degrees for each input signal. Since the inverter inputs are initially shifted 90 degrees by the quad hybrid, each inverter can be switched independently to provide an additional 180 degree shift on each signal. Therefore, the inverter outputs, when combined, provide a resultant signal which can be selectively shifted from 0 degrees to 360 degrees out of phase with the original forward transmit sample. Utilizing this technique total phase control of the transmit sample can be achieved permitting phase error detection and correction when compared to the desired signal.

As illustrated in FIG. 2, a second quadrature hybrid 45 is utilized in the circuit 30. For applications where improved wideband performance is required, the second quadrature hybrid 44 can be inserted in the desired signal path. The phase shift provided by this second hybrid 45 closely matches the shift provided by the hybrid 31 to minimize the control range required to obtain a zero error correction signal, thus improving wideband performance.

To effectively cancel the rejected transmit signal from the receive signal, the combiner circuit 30 must control both the phase and the amplitude of the transmit sample prior to summing. In the adaptive combiner, amplitude control is provided by the electronically controlled attenuators 36 and 38 to produce outputs coupled to the summer for final signal comparisons and error detection.

In the summer 42, the outputs of the attenuators 36 and 37 are recombined to form a resultant signal for summation with the desired signal to null out the reflected transmit signal. A sample of this resultant (error signal) contains the residual interference, plus the receive signal. The error signal is coupled to the control circuitry on line 48 to provide a negative feedback loop to minimize the power in the error signal by controlling the polarity and amplitude of the I and Q signals.

Figure 3:
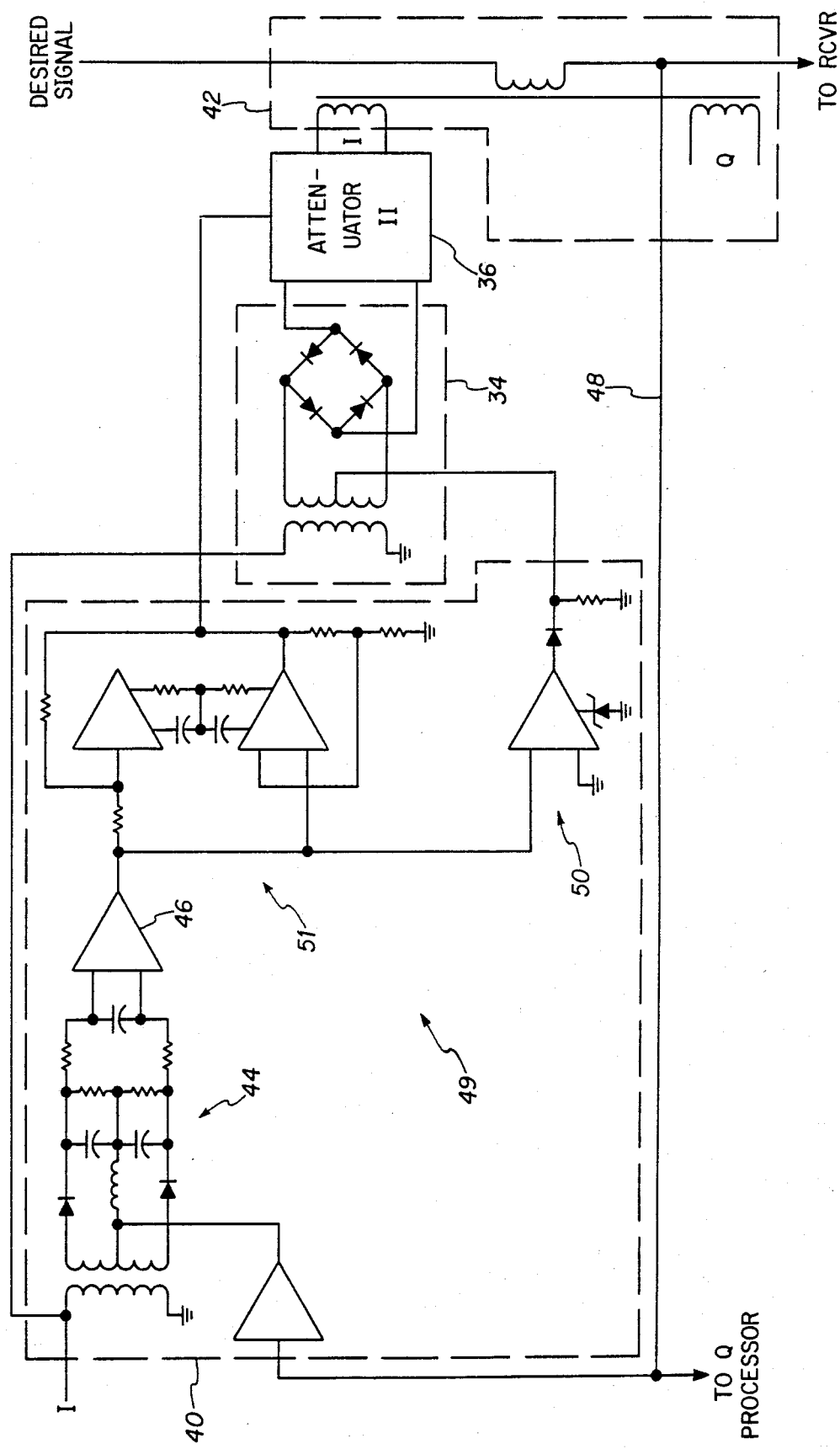
FIG. 3 is a schematic diagram of a portion of the control circuit of the simultaneous adapter of FIG. 2.

A simplified schematic diagram of a portion of the combiner control 40 is shown in FIG. 3. The circuit shown in FIG. 3 is intended to control the processing of the I channel signal, and a similar circuit, not shown, is provided to process the Q channel signal. The I signal is conducted to a phase detector and filter 45, to develop an output, the DC components of which are amplified by amplifier 46 and applied to a multiplier circuit 49. In the multiplier circuit 49, the sign of the control signal is developed by circuit 50 to control the sign of the resultant signal and the magnitude of the control signal is developed by circuit 51 to set the resultant magnitude. The outputs of the sign developing circuit 50 and the magnitude setting circuit 51 are applied to the inverter 34 and attenuator 36, respectively.

Thus, in operation, when a signal is applied to the balanced diode mixer or phase detector 45, used with a balanced RC filter to give a DC voltage proportional to the amplitude of the coherent part of the error signal, a filtered control voltage is developed and amplified in the operational amplifier 46. The amplified signal is then applied to the sign and magnitude processors, 50 and 51.

The magnitude processing circuit 51 is comprised of two operational amplifiers to drive the three stage diode attenuator 36, (diodes not shown) which may be, for example, a pin diode shunt attenuator. The sign processing circuit 50 is an operational amplifier which develops an output for application to a diode bridge inverter 34. The amplitude controlled I sample then is applied to a summer which may conveniently be a simple broadband transformer.

As mentioned, the Q signal processor is identical in design to the I signal processor. Each of the two processors permit generation of an appropriate cancellation signal vector over two quadrants. Together the I and Q samples provide cancellation signals to cover all four quadrants of vector space (i.e., 360 degrees). This permits the use of simple two quadrature correlators and multipliers.

The critical parameters of the combiner are essentially very few. The time constants of the filter and the overall envelope delay of the combiner should be low compared to the period of the highest envelope frequencies to be cancelled. Errors here reflect directly as null depth limiters. The error loop gain must be great enough to provide full range error control with only a few microvolts of error voltage, i.e. 1 microvolts error for 10 volts of control $G=10exp7=140$ dB. Standard operatonal amplifiers typically have more than 100 dB gain at DC. Two operatonal amplifiers ($\frac{1}{2}$ IC package) can, therefore, easily provide adquate gain.

Although the invention has been described and illustrated with a certain degree of particularity, the present disclosure has been made by way of example only and numerous changes in the combination and arrangement of parts may be resorted to by those skilled in the art without departing from the spirit and scope of the invention as hereinafter claimed.

I claim:

1. Apparatus for enabling full duplex operation of co-located transmitter and receiver on the same frequency, comprising:
    means for deriving a sample of a transmit signal generated by the transmitter,
    means for deriving a sample of a receive signal which is to be applied to the receiver, and
    an adaptive combiner comprising a 90 degree quadrature hybrid, responsive to said transmit signal sample, to produce I and Q signals, first and second inverters to selectively invert said I and Q signals, respectively, first and second attenuators to controllably attenuate said respective I and Q signals, and a summer to sum said selectively inverted and attenuated I and Q signals with the receive signal sample, whereby portions of the receive signal sample representing the signal generated by the transmitter are cancelled.

2. The apparatus of claim 1 wherein the means for deriving a sample of a transmit signal includes a directional coupler associated with a transmitter transmission line to sample the signal generated by the transmitter and travelling towards a transmitting antenna to produce an interference sample signal comprising at least a portion of the transmitted signal, and wherein said means for deriving a sample of a receive signal includes a directional coupler associated with a receiver transmission line to sample the signal received by a receiving antenna and travelling in the direction of the receiver.

3. The apparatus of claim 2 wherein said transmitter and receiver transmission lines are the same and said transmitting and receiving antennas are the same.

4. Apparatus for enabling duplex operation of a transmitter and receiver from a single antenna at the same operating frequency, comprising:
    means, including a directional coupler associated with a transmission line to said antenna, for deriving a transmitter signal which is a sample of the forward and reflected transmitter energy to said antenna;
    means, including another directional coupler associated with said line, for deriving a sample of the received signal from said antenna;
    and means for combining the sample transmitter signal and sample received signal for cancelling the forward and reflected transmitter energy components from said sample received signal to produce an output signal for application to said receiver, including:
        a 90 degree quadrature hybrid for converting the sample transmitter signal to respective I and Q interference signals,
        first and second inverters for controllably inverting said respective I and Q signals,
        first and second attenuators to controllably attenuate said respective I and Q signals,
        a control circuit for controlling the operation of said attenuators and for controlling said inverters by selectively switching the inverters off and, so that each of the inverters can provide a respective phase control of 180 degree of its respective input signal, said control circuit thereby producing a signal which can cancel said components in said sample received signal,
        and a summer to add the controllably inverted and attenuated interference signals to said sample received signal to produce said output signal.

5. The apparatus of claim 4 wherein said control circuit comprises, for each of the I and Q interference signals,
    a phase detector, responsive to the associated interference signal and to a sample of said output signal;
    means for amplifying the output of the phase detector to provide a d-c signal;
    means for detecting the sign of the d-c signal;
    means controlled by the amplified d-c signal for controlling the magnitude of the associated interference signal; and
    means controlled by the sign of the d-c signal to control the sign of the associated interference signal.

6. Apparatus for enabling duplex operation of a transmitter and receiver from a single antenna at the same operating frequency, comprising:
    means, including a directional coupler associated with a transmission line to said antenna for deriving a transmitter signal which is a sample of the forward and reflected transmitter energy to said antenna;
    means, including another directional coupler associated with said line, for deriving a sample of the received signal from said antenna;
    and means for combining the sample transmitter signal and sample received signal for cancelling the forward and reflected transmitter energy components from said sample received signal to produce an output signal for application to said receiver, including:

means for deriving an error signal which is a sample of said output signal, means for deriving I and Q signals from said sample transmitter signal, means for automatically sensing the amplitude and phase of those parts of the I and Q signals which are coherent with the error signal, and means for controllably inverting and attenuating the I and Q signals for addition to the sample received signal, to cancel said transmitter energy components.

* * * * *